United States Patent
Tanaka et al.

(10) Patent No.: US 12,381,208 B2
(45) Date of Patent: *Aug. 5, 2025

(54) NEGATIVE ELECTRODE MIXTURE COMPOSITE BODY FOR FLUORIDE ION SECONDARY BATTERIES, NEGATIVE ELECTRODE FOR FLUORIDE ION SECONDARY BATTERIES AND SECONDARY BATTERY EACH USING SAID COMPOSITE BODY, AND METHOD FOR PRODUCING SAID COMPOSITE BODY

(71) Applicant: HONDA MOTOR CO., LTD., Tokyo (JP)

(72) Inventors: Akihisa Tanaka, Saitama (JP); Yoshiyuki Morita, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 229 days.

This patent is subject to a terminal disclaimer.

(21) Appl. No.: 17/767,441

(22) PCT Filed: Oct. 9, 2019

(86) PCT No.: PCT/JP2019/039884
§ 371 (c)(1),
(2) Date: Apr. 8, 2022

(87) PCT Pub. No.: WO2021/070298
PCT Pub. Date: Apr. 15, 2021

(65) Prior Publication Data
US 2024/0072248 A1     Feb. 29, 2024

(51) Int. Cl.
*H01M 4/38*     (2006.01)
*C01F 7/00*     (2022.01)
(Continued)

(52) U.S. Cl.
CPC ............... *H01M 4/38* (2013.01); *C01F 7/00* (2013.01); *H01M 4/134* (2013.01);
(Continued)

(58) Field of Classification Search
CPC .... C01F 7/00; C01P 2004/62; C01P 2004/64; C01P 2006/40; H01M 10/05;
(Continued)

(56) References Cited

U.S. PATENT DOCUMENTS

| 10,164,240 B2 | 12/2018 | Kim et al. |
| 2009/0029237 A1 | 1/2009 | Yazami |

(Continued)

FOREIGN PATENT DOCUMENTS

| CN | 105742583 A | 7/2016 |
| CN | 106133956 A | 11/2016 |

(Continued)

OTHER PUBLICATIONS

Machine translation JP2019129096A (Year: 2019).*
(Continued)

*Primary Examiner* — Victoria H Lynch
(74) *Attorney, Agent, or Firm* — CKC & Partners Co. LLC (57) ABSTRACT

The present invention provides: a negative electrode mixture composite body for fluoride ion secondary batteries, said composite body enabling the achievement of a fluoride ion secondary battery that has high initial charge/discharge efficiency; a negative electrode for fluoride ion secondary batteries and a secondary battery, each using this composite body; and a method for producing this composite body. According to the present invention, a composite body is formed using, as a negative electrode active material, nanometer-sized aluminum particles together with the other constituents of a negative electrode mixture, so that coating (Continued)

by aluminum fluoride that is formed by a re-fluoridation reaction after defluoridation is suppressed, while suppressing aggregation of negative electrode active material particles.

4 Claims, 11 Drawing Sheets

(51) Int. Cl.
    *H01M 4/134*     (2010.01)
    *H01M 4/1395*     (2010.01)
    *H01M 4/62*     (2006.01)
    *H01M 10/05*     (2010.01)
    *H01M 4/02*     (2006.01)

(52) U.S. Cl.
    CPC ......... *H01M 4/1395* (2013.01); *H01M 4/625* (2013.01); *H01M 10/05* (2013.01); *C01P 2004/62* (2013.01); *C01P 2004/64* (2013.01); *C01P 2006/40* (2013.01); *H01M 2004/021* (2013.01); *H01M 2004/027* (2013.01)

(58) Field of Classification Search
    CPC ....... H01M 10/0562; H01M 2004/021; H01M 2004/027; H01M 4/134; H01M 4/136; H01M 4/1395; H01M 4/1397; H01M 4/38; H01M 4/582; H01M 4/625; Y02E 60/10
    See application file for complete search history.

(56) References Cited

U.S. PATENT DOCUMENTS

| | | |
|---|---|---|
| 2010/0021800 A1 | 1/2010 | Yazami et al. |
| 2014/0030559 A1 | 1/2014 | Yazami et al. |
| 2016/0087308 A1 | 3/2016 | Nakamoto et al. |
| 2016/0190597 A1 | 6/2016 | Kim et al. |
| 2016/0204476 A1 | 7/2016 | Kobayashi |
| 2017/0062805 A1 | 3/2017 | Nakamoto et al. |
| 2017/0084913 A1 | 3/2017 | Misaki et al. |
| 2017/0352875 A1 | 12/2017 | Miki et al. |
| 2017/0352887 A1 | 12/2017 | Nakamoto et al. |
| 2019/0006709 A1 | 1/2019 | Komori |
| 2019/0103607 A1 | 4/2019 | Omichi et al. |
| 2019/0140279 A1 | 5/2019 | Miki |
| 2019/0207207 A1 | 7/2019 | Komori |
| 2019/0207244 A1 | 7/2019 | Komori |
| 2019/0296352 A1 | 9/2019 | Adachi |
| 2021/0273222 A1 | 9/2021 | Komori |

FOREIGN PATENT DOCUMENTS

| | | |
|---|---|---|
| CN | 109216781 A | 1/2019 |
| CN | 109755566 A | 5/2019 |
| CN | 109980271 A | 7/2019 |
| CN | 109980301 A | 7/2019 |
| CN | 110021739 A | 7/2019 |
| JP | 2000106154 A | 4/2000 |
| JP | 2009093968 A | 4/2009 |
| JP | 2016062821 A | 4/2016 |
| JP | 2017050113 A | 3/2017 |
| JP | 2017216209 A | 12/2017 |
| JP | 2017220301 A | 12/2017 |
| JP | 2018059703 A | 4/2018 |
| JP | 2018206755 A | 12/2018 |
| JP | 2019087403 A | 6/2019 |
| JP | 2019121595 A | 7/2019 |
| JP | 2019121596 A | 7/2019 |
| JP | 2019129096 A | 8/2019 |
| JP | 2019169438 A | 10/2019 |
| KR | 20070035194 A | 3/2007 |
| WO | 2007146453 A2 | 12/2007 |
| WO | 2019070414 A1 | 4/2019 |
| WO | 2019187943 A1 | 10/2019 |

OTHER PUBLICATIONS

C. Rongeat et al., "Development of new anode composite materials for fluoride ion batteries", J. Mater. Chem. A, 2014. 2. 20861-20872.
Le Zhang et al., "Study of all solid-state rechargeable fluoride ion batteries based on thin-film electrolyte", J. Solid State Electroehem (2017) 21: 1243-1251.
M. Anji Reddy et al., "Batteries based on fluoride shuttle", J. Mater. Chem. , 2011, 21, 17059.
Oliver Clemens et al., "Electrochemical fluorination of perovskite type BaFeO2.5", Dalton Trans. , 2014, 43, 15771-15778.
Carine Rongeat et al., "Solid Electrolytes for Fluoride Ion Batteries: Ionic Conductivity in Polycrystalline Tysonite-Type Fluorides", ACS Appl. Mater. Interfaces 2014, 6, 2103-2110.
Carine Rongeat et al., "Nanostructured Fluorite-Type Fluorides as Electrolytes for Fluoride Ion Batteries", J. Phys. Chem. C 2013, 117, 4943-4950.
A. Duvel et al., "Mechanosynthesis of the Fast Fluoride Ion Conductor Ba1-xLaxF2+x: From the Fluorite to the Tysonite Structure", J. Phys. Chem. C 2014, 118, 7117-7129.
Office Action issued Oct. 19, 2024 in the CN Patent Application No. 201980101214.9.
Office Action issued Jul. 31, 2024 in the CN Patent Application No. 201980101227.6.
Office Action issued Nov. 8, 2023 in the CN Patent Application No. 201980101215.3.
Nathan Owen and Qi Zhang, Investigations of aluminum fluoride as a new cathode material for lithium-ion batteries, Feb. 20, 2017.
Office Action issued Dec. 6, 2024 in the U.S. Appl. No. 17/767,450.
Office Action issued Nov. 6, 2024 in the U.S. Appl. No. 17/767,442.

* cited by examiner

NEGATIVE ELECTRODE MIXTURE COMPOSITE BODY FOR FLUORIDE ION SECONDARY BATTERIES, NEGATIVE ELECTRODE FOR FLUORIDE ION SECONDARY BATTERIES AND SECONDARY BATTERY EACH USING SAID COMPOSITE BODY, AND METHOD FOR PRODUCING SAID COMPOSITE BODY

TECHNICAL FIELD

The present invention relates to a negative electrode material mixture composite for a fluoride ion secondary battery, a negative electrode for a fluoride ion secondary battery and a secondary battery each using the composite and a method for manufacturing the composite.

BACKGROUND ART

Conventionally, as secondary batteries having a high energy density, lithium ion secondary batteries are widely used. The lithium ion secondary battery has a structure in which a separator is present between a positive electrode and a negative electrode and a liquid electrolyte (electrolytic liquid) is filled.

Since the electrolytic liquid of the lithium ion secondary battery is generally a flammable organic solvent, in particular, there may be a problem in safety for heat. Hence, instead of an organic liquid electrolyte, a solid-state battery using an inorganic solid electrolyte is proposed (see Patent Document 1).

As the battery using the solid electrolyte as described above, a secondary battery using fluoride ions is also considered (see Patent Document 2). A fluoride ion secondary battery is a secondary battery which uses a fluoride ion ($F^-$) as a carrier, and it is known that the fluoride ion secondary battery has high theoretical energy. It is expected that the battery characteristics thereof exceed those of the lithium ion secondary battery.

Here, as a negative electrode active material for the fluoride ion secondary battery, for example, $MgF_2$, $CaF_2$, $CeF_3$ and the like are reported (see Non-Patent Documents 1 and 2). However, in the fluoride ion secondary batteries using these negative electrode active materials, the charge/discharge efficiency thereof is 10 to 20%, and thus the energy efficiency thereof serving as a secondary battery is disadvantageously low. The charge/discharge capacity thereof is only about 10 to 20% of a theoretical capacity, and thus a high capacity is not achieved as compared with the lithium ion secondary battery and a Ni-MH battery which are currently used.

Figure 1:
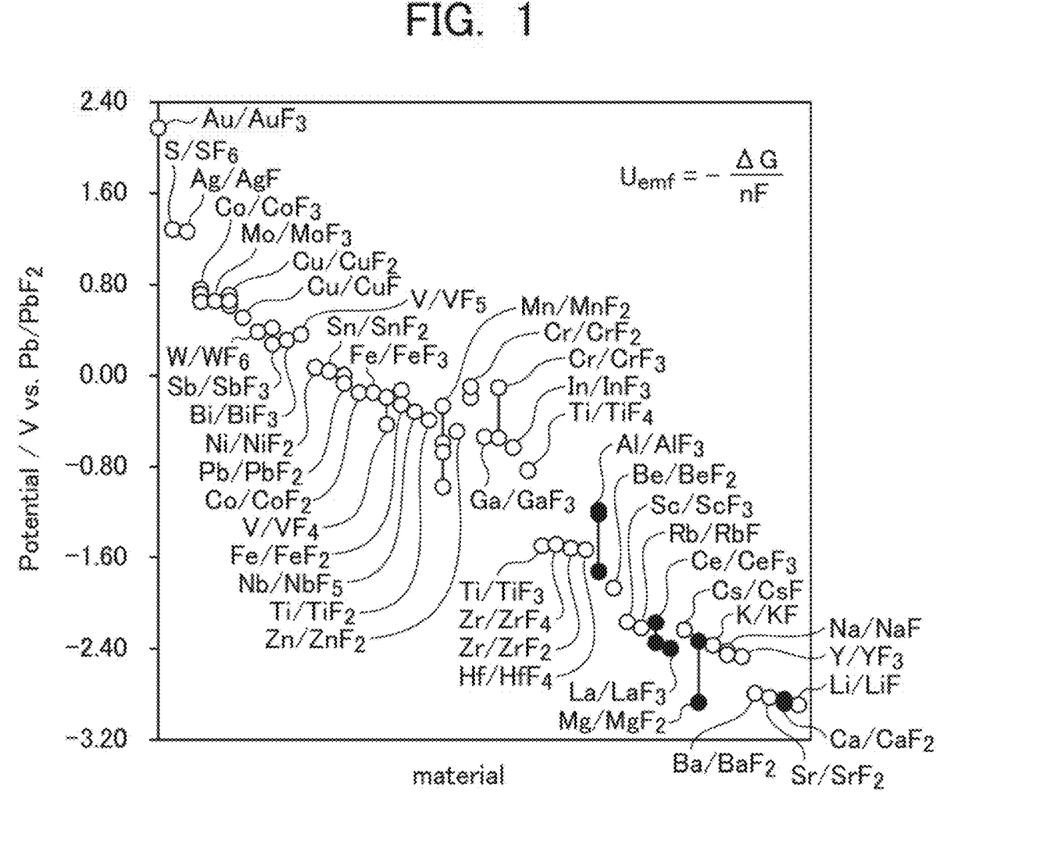
FIG. 1 is a diagram showing potentials calculated from Gibbs energy.

As the solid electrolyte used in the fluoride ion secondary battery, for example, $La_{1-x}Ba_xF_{3-x}$ where x=0.01 to 0.2 (hereinafter referred to as an LBF) is mentioned (see Non-Patent Documents 1 to 4). As shown in FIG. 1, the reduction side potential window of the LBF receives a constraint at −2.41 V vs. $Pb/PbF_2$ which is the potential of $La/LaF_3$ calculated from Gibbs energy.

By contrast, as the potentials of the negative electrode active materials for the fluoride ion secondary battery which are currently reported, as shown in FIG. 1, $MgF_2$ has a potential of −2.35 to −2.87 V vs. $Pb/PbF_2$, $CaF_2$ has a potential of −2.85 to −2.89 V vs. $Pb/PbF_2$ and $CaF_3$ has a potential of −2.18 to −2.37 V vs. $Pb/PbF_2$. Hence, under the constraint of −2.41 V serving as the reduction potential window of the LBF, the defluorination/refluorination reactions of the negative electrode active materials described above cannot be provided with consideration given to the overvoltage thereof.

On the other hand, with respect to the positive electrode reaction, for example, for positive electrode active materials such as $Cu/CuF_2$ and $Bi/BiF_3$, the results of charge/discharge tests indicating high utilization rates and reversible reactions are reported (see Patent Documents 3 and 4 and Non-Patent Documents 1 to 3).

Hence, in order to achieve, in the fluoride ion secondary battery, a practical all-battery reaction in which positive/negative electrode reactions are combined, it is necessary to provide a negative electrode active material which causes a reversible negative electrode reaction at a high utilization rate.

For this requirement, Patent Document 5 focuses attention on aluminum fluoride ($AlF_3$: −1.78 V vs. $Pb/PbF_2$) in which charge/discharge reactions (defluorination/refluorination reactions) are present in the constraint of −2.41 V serving as the potential window of the LBF that is the fluoride ion solid electrolyte, and further proposes a negative electrode active material obtained by modifying the aluminum fluoride ($AlF_3$) such that fluoride ions ($F^-$) are previously and partially desorbed from the structure of the perfect crystal of six-coordinated octahedron included in the aluminum fluoride ($AlF_3$) and that holes are provided in positions where fluorine atoms were present.

In the negative electrode active material of Patent Document 5, the holes which are provided in the positions where fluorine atoms were present serve as the starting point of the defluorination/refluorination reactions, and thus it is possible to cause a desired negative electrode reaction at a high utilization rate in a reversible manner.

Patent Document 1: Japanese Unexamined Patent Application, Publication No. 2000-106154
Patent Document 2: Japanese Unexamined Patent Application, Publication No. 2017-050113
Patent Document 3: Japanese Unexamined Patent Application, Publication No. 2018-206755
Patent Document 4: Japanese Unexamined Patent Application, Publication No. 2019-087403
Patent Document 5: Japanese Unexamined Patent Application, Publication No. 2018-059703
Non-Patent Document 1: J. Mater. Chem. A. 2014.2. 20861-20872
Non-Patent Document 2: J. Solid State Electrochem (2017) 21:1243-1251
Non-Patent Document 3: J. Mater. Chem., 2011, 21, 17059
Non-Patent Document 4: Dalton Trans., 2014, 43, 15771-15778

DISCLOSURE OF THE INVENTION

Problems to be Solved by the Invention

However, in the fluoride ion secondary battery using the negative electrode active material proposed in Patent Document 5, the electrification efficiency of an electrochemical first cycle is about 50%, and thus the electrification efficiency is required to be further enhanced.

The present invention is made in view of the background technologies described above, and an object thereof is to provide, in a fluoride ion secondary battery, a negative electrode material mixture composite for a fluoride ion secondary battery which can realize the fluoride ion secondary battery having high initial charge/discharge efficiency, a negative electrode for a fluoride ion secondary battery and a secondary battery each using the composite and a method for manufacturing the composite.

Means for Solving the Problems

The present inventors have conducted thorough studies on the cause of the reduction in the electrification efficiency of the negative electrode active material proposed in Patent Document 5. Then, the present inventors consider that the aluminum fluoride formed by the refluorination reaction after the defluorination coats the surface of the negative electrode active material to form an insulating layer, and that thus the reactivity is lowered.

In addition, the present inventors consider that since the negative electrode active material is nanoparticles, the particles are agglomerated at the time of initial charge/discharge, and that consequently, an electron conduction path and an ion conduction path are not sufficiently formed.

Then, the present inventors have found that when nanoparticle-sized aluminum is used as the negative electrode active material to form a composite together with the other components of a negative electrode material mixture, it is possible to suppress the coating of the aluminum fluoride formed by the refluorination reaction after the defluorination and to suppress the agglomeration of the particles of the negative electrode active material, and that consequently, a fluoride ion secondary battery having high initial charge/discharge efficiency can be realized, with the result that the present invention is completed.

Specifically, a negative electrode material mixture composite for a fluoride ion secondary battery according to the present invention includes: a negative electrode active material; and a fluoride ion conductive fluoride, and the negative electrode active material is aluminum.

The aluminum may be in the form of particles with an average particle diameter of 10 nm to 200 nm.

The negative electrode material mixture composite for a fluoride ion secondary battery may further include carbon black.

The negative electrode material mixture composite for a fluoride ion secondary battery may have a shape of particles.

The negative electrode material mixture composite for a fluoride ion secondary battery may be in the form of particles with an average particle diameter of 0.5 μm to 10 μm.

A negative electrode for a fluoride ion secondary battery according to another invention includes the negative electrode material mixture composite for a fluoride ion secondary battery described above.

A fluoride ion secondary battery according to another invention includes: the negative electrode described above; a solid electrolyte; and a positive electrode.

A method for manufacturing a negative electrode material mixture composite for a fluoride ion secondary battery according to another invention includes: a mixing step of mixing a negative electrode active material, a fluoride ion conductive fluoride and carbon black to obtain a negative electrode material mixture; and a composite particle formation step of subjecting the negative electrode material mixture to grinding and mixing treatment to complex the negative electrode active material, the fluoride ion conductive fluoride and the carbon black so as to obtain composite particles, and the negative electrode active material is aluminum.

In the method for manufacturing a negative electrode material mixture composite for a fluoride ion secondary battery described above, the aluminum may be in the form of particles with an average particle diameter of 10 nm to 200 nm.

In the method for manufacturing a negative electrode material mixture composite for a fluoride ion secondary battery described above, the grinding and mixing treatment may be dry grinding.

In the method for manufacturing the negative electrode material mixture composite for a fluoride ion secondary battery described above, the grinding and mixing treatment may be performed with a ball mill.

Effects of the Invention

With a negative electrode material mixture composite for a fluoride ion secondary battery according to the present invention, it is possible to realize a fluoride ion secondary battery having high initial charge/discharge efficiency. Since the battery having high initial charge/discharge efficiency is achieved, a capacity at the time of charge can be discharged without being lost, with the result that the energy density of the battery can be enhanced.

PREFERRED MODE FOR CARRYING OUT THE INVENTION

An embodiment of the present invention will be described below.

<Negative Electrode Material Mixture Composite for Fluoride Ion Secondary Battery>

The negative electrode of a fluoride ion secondary battery needs to be able to store fluoride ions (F⁻) at the time of discharge and to discharge fluoride ions (F⁻) at the time of charge.

A negative electrode material mixture composite for a fluoride ion secondary battery according to the present invention includes a negative electrode active material and a fluoride ion conductive fluoride, and is a composite in which the negative electrode active material is aluminum.

The negative electrode material mixture composite for a fluoride ion secondary battery according to the present invention preferably includes, as constituent components, aluminum serving as the negative electrode active material and the fluoride ion conductive fluoride, and may be a composite which arbitrarily includes other components.

In the negative electrode material mixture composite for a fluoride ion secondary battery according to the present invention, aluminum serving as the negative electrode active material forms an alloy with another constituent component of the composite, and aluminum is not present as a simple substance.

[Shape of Composite]

The negative electrode material mixture composite for a fluoride ion secondary battery according to the present invention is preferably granulated into spherical particles. Within each of the particles, aluminum serving as the negative electrode active material, the fluoride ion conductive fluoride and other arbitrary components are present.

The negative electrode material mixture composite is granulated into spherical particles, and thus when the electrode is pressed, the electrode into which the negative electrode material mixture composite is further filled without any gap can be produced, with the result that the volumetric energy density of the battery can be enhanced.

The constituent components of the composite are present within each of the composite particles, and thus an electron conduction path and an ion conduction path for fluorination/defluorination reactions necessary for an electrochemical reaction can be formed into nanosized paths.

In order to enhance the efficiency of the electrochemical reaction in the fluoride ion secondary battery, it is effective to enlarge the surface area of the materials of the negative electrode, and when the shape of the negative electrode material mixture composite is spherical, a negative electrode for a fluoride ion secondary battery which is the aggregate of spheres has a high surface area. Consequently, a contact area with a solid electrolyte included in an adjacent solid electrolyte layer can be increased.

(Average Particle Diameter)

The average particle diameter of the negative electrode material mixture composite for a fluoride ion secondary battery according to the present invention is preferably in a range of 0.5 to 10 μm. The average particle diameter is particularly preferably in a range of 1 to 5 μm.

The average particle diameter of the negative electrode material mixture composite for a fluoride ion secondary battery is in the range described above, and thus when grinding and mixing treatment for obtaining the composite particles is performed, the particles are made to collide with each other so as to be granulated, with the result that within the microsized particles, the electron conduction path and the ion conduction path for fluorination/defluorination reactions are securely adhered and formed. Since the structure of the particles having the electron conduction path and the ion conduction path can follow a change in volume caused by the reaction of aluminum serving as the negative electrode active material, the collapse of the structure of a negative electrode layer can be suppressed, with the result that the reversibility of the electrochemical reaction can be improved.

[Negative Electrode Active Material]

The negative electrode active material of the negative electrode material mixture composite for a fluoride ion secondary battery according to the present invention is aluminum. As shown in FIG. 1, the potential of aluminum fluoride $AlF_3$ which is a fluoride of aluminum is −1.78 V vs. $Pb/PbF_2$, and charge/discharge reactions (defluorination/refluorination reactions) are present in the constraint of −2.41 V serving as the potential window of an LBF which is a fluoride ion solid electrolyte.

Hence, the defluorination/refluorination reactions of aluminum sufficiently proceed under the constraint of −2.41 V serving as the reduction potential window of the LBF with consideration given to the overvoltage thereof. Since aluminum is an inexpensive material, it is economically advantageous to use aluminum.

On the surface of aluminum, an oxide film may be present.

(Shape)

The shape of aluminum serving as the negative electrode active material is preferably spherical. The negative electrode active material is spherical, and thus when the electrode is pressed, the electrode into which the negative electrode active material is further filled without any gap can be produced, with the result that the volumetric energy density of the battery can be enhanced.

(Average Particle Diameter)

The average particle diameter of aluminum is preferably in a range of 10 to 200 nm, and is particularly preferably in a range of 40 to 100 nm.

The average particle diameter of aluminum serving as the negative electrode active material is in the range of 10 to 200 nm, and thus the negative electrode material mixture composite for a fluoride ion secondary battery which is obtained is a substantially true spherical granulated composite.

[Fluoride Ion Conductive Fluoride]

The fluoride ion conductive fluoride which is an essential constituent component of the negative electrode material mixture composite for a fluoride ion secondary battery according to the present invention is not particularly limited as long as the fluoride ion conductive fluoride is a fluoride having fluoride ion conductivity. For example, $Ce_{0.95}Ba_{0.05}F_{2.95}$, $Ba_{0.6}La_{0.4}F_{2.4}$ and the like are mentioned.

Among them, $Ce_{0.95}Ba_{0.05}F_{2.95}$ is preferably used because it has high ion conductivity.

(Average Particle Diameter)

The average particle diameter of the fluoride ion conductive fluoride is preferably in a range of 0.1 to 100 μm, and is particularly preferably in a range of 0.1 to 10 μm.

The average particle diameter of the fluoride ion conductive fluoride is in the range of 0.1 to 100 μm, and thus it is possible to form an electrode of a thin film having relatively high ion conductivity.

[Other Components]

The negative electrode material mixture composite for a fluoride ion secondary battery according to the present invention may arbitrarily include other components other than aluminum serving as the negative electrode active material and the fluoride ion conductive fluoride which are essential constituent components. Examples of the other components include a conductive aid, a binder and the like.
(Conductive Aid)

In particular, the negative electrode material mixture composite for a fluoride ion secondary battery according to the present invention preferably includes carbon black as the conductive aid. The carbon black is present within the composite particles, and thus the electron conduction path and the ion conduction path for fluorination/defluorination reactions necessary for the electrochemical reaction can be easily formed.

The type of carbon black is not particularly limited, and examples thereof include furnace black, Ketjen black, acetylene black and the like.

Although the average particle diameter of the carbon black is not particularly limited, the average particle diameter is preferably in a range of 20 to 50 nm.

The average particle diameter of the carbon black is in the range of 20 to 50 nm, and thus an electrode having high electron conductivity with a small weight can be formed.
[Composition]
(Aluminum)

The ratio of aluminum to the entire negative electrode material mixture composite for a fluoride ion secondary battery according to the present invention is preferably 5 to 25% by mass, and is further preferably in a range of 5 to 13% by mass.

In the negative electrode material mixture composite for a fluoride ion secondary battery according to the present invention, the ratio of aluminum is in the range described above, and thus the capacity of the obtained fluoride ion secondary battery per weight is increased.
(Fluoride Ion Conductive Fluoride)

The ratio of the fluoride ion conductive fluoride to the entire negative electrode material mixture composite for a fluoride ion secondary battery according to the present invention is preferably 70 to 90% by mass, and is further preferably in a range of 80 to 90% by mass.

In the negative electrode material mixture composite for a fluoride ion secondary battery according to the present invention, the ratio of the fluoride ion conductive fluoride is in the range described above, and thus an electrode having high ion conductivity can be formed.
(Conductive Aid)

When the negative electrode material mixture composite for a fluoride ion secondary battery according to the present invention includes the conductive aid, the ratio of the conductive aid to the entire negative electrode material mixture composite for a fluoride ion secondary battery is preferably 5 to 25% by mass, and is further preferably in a range of 5 to 10% by mass.

In the negative electrode material mixture composite for a fluoride ion secondary battery according to the present invention, the ratio of the conductive aid is in the range described above, and thus an electrode having high electron conductivity can be formed.
<Negative Electrode for Fluoride Ion Secondary Battery>

A negative electrode for a fluoride ion secondary battery according to the present invention includes the negative electrode material mixture composite for a fluoride ion secondary battery according to the present invention. As long as the negative electrode includes the negative electrode material mixture composite for a fluoride ion secondary battery according to the present invention, the other configurations are not particularly limited.

<Fluoride Ion Secondary Battery>

A fluoride ion secondary battery according to the present invention includes: the negative electrode for a fluoride ion secondary battery which includes the negative electrode material mixture composite for a fluoride ion secondary battery according to the present invention; a solid electrolyte; and a positive electrode. As long as the fluoride ion secondary battery according to the present invention uses the negative electrode including the negative electrode material mixture composite for a fluoride ion secondary battery according to the present invention, the other configurations are not particularly limited.

In the present invention, a positive electrode material is selected which provides a sufficiently high standard electrode potential to the standard electrode potential of the negative electrode for a fluoride ion secondary battery including the negative electrode material mixture composite for a fluoride ion secondary battery according to the present invention, and thus it is possible to realize the enhanced characteristics of the fluoride ion secondary battery and a desired battery voltage.
<Method for Manufacturing Negative Electrode Material Mixture Composite for Fluoride Ion Secondary Battery>

A method for manufacturing the negative electrode material mixture composite for a fluoride ion secondary battery according to the present invention includes a mixture step and a composite particle formation step.
[Mixture Step]

The mixture step in the method for manufacturing the negative electrode material mixture composite for a fluoride ion secondary battery according to the present invention is a step of mixing the negative electrode active material, the fluoride ion conductive fluoride and the carbon black to obtain a negative electrode material mixture, and in the present invention, the negative electrode active material is aluminum.

Aluminum serving as the negative electrode active material, the fluoride ion conductive fluoride and the carbon black serving as the conductive aid are the same as those described above. Aluminum, the fluoride ion conductive fluoride and the carbon black are preferably included as essential components, and other materials may be arbitrarily mixed.

A method for the mixing is not particularly limited, and it is preferable to weigh the desired masses of the individual components and to put them into the same space simultaneously or sequentially so as to mix them. When they are sequentially put, the order thereof is not particularly limited.
[Composite Particle Formation Step]

The composite particle formation step is a step of subjecting the negative electrode material mixture obtained in the mixture step to grinding and mixing treatment to complex the negative electrode active material, the fluoride ion conductive fluoride and the carbon black so as to obtain the composite particles.

In the composite particle formation step, the negative electrode active material, the fluoride ion conductive fluoride and the carbon black included in the negative electrode material mixture are alloyed and granulated.

Since aluminum serving as the negative electrode active material is a relatively soft material, aluminum is carried by the fluoride ion conductive fluoride which is a hard material due to an impact caused by the grinding and mixing treatment. Then, it is considered that since aluminum is nanoparticles, aluminum can be thermally diffused within the composite due to heat caused by the grinding and mixing treatment, and that consequently, the composite can be alloyed and granulated.

The grinding and mixing treatment for alloying and granulating the negative electrode material mixture is not particularly limited as long as the grinding and mixing treatment is a method in which the negative electrode material mixture can be mixed while being ground under an inert atmosphere.

Although the grinding and mixing treatment may be dry grinding or wet grinding, since an oxide film on the surface of the particles peels off at the time of the grinding and mixing treatment to cause an active surface to appear, the dry grinding under an inert atmosphere is preferable.

nitride (made by Fritsch Co., Ltd. in Germany, PL-7 dedicated container, internal volume: 45 cc), and then $Ce_{0.95}Ba_{0.05}F_{2.95}$ and the acetylene black were put thereinto. Furthermore, 40 g of balls having a diameter of 2 mm and made of silicon nitride was put thereinto, and the ball mill container was sealed.

[Composite Particle Formation Step]

The sealed ball mill container was rotated at a rotation speed of 400 rpm for 10 hours to perform grinding and mixing treatment, and thus the negative electrode material mixture composite for a fluoride ion secondary battery was obtained. After the grinding and mixing treatment, the processed powder was collected. A collection rate is shown in table 1.

TABLE 1

| | | Example 1 | Example 2 | Example 3 | Example 4 | Comparative Example 1 |
|---|---|---|---|---|---|---|
| Negative electrode active material | Type | Aluminum | Aluminum | Aluminum | Aluminum | Modified aluminum fluoride |
| | Average particle diameter (nm) | 40 | 40 | 40 | 100 | 49 |
| | Mixed amount (mg) | 200 | 250 | 500 | 200 | 250 |
| Fluoride ion conductive fluoride | Type | $Ce_{0.95}Ba_{0.05}F_{2.95}$ | $Ce_{0.95}Ba_{0.05}F_{2.95}$ | $Ce_{0.95}Ba_{0.05}F_{2.95}$ | $Ce_{0.95}Ba_{0.05}F_{2.95}$ | $Ce_{0.95}Ba_{0.05}F_{2.95}$ |
| | Average particle diameter (nm) | 10 | 10 | 10 | 10 | 10 |
| | Mixed amount (mg) | 1584 | 1633 | 1400 | 1584 | 1633 |
| Conductive aid | Type | Acetylene black | Acetylene black | Acetylene black | Acetylene black | Acetylene black |
| | Average particle diameter (nm) | 35 | 35 | 35 | 35 | 35 |
| | Mixed amount (mg) | 216 | 117 | 100 | 215 | 117 |
| Collection rate (mass %) | | 78 | 80 | 85 | 82 | 94 |

In the present invention, in particular, the grinding and mixing treatment is preferably performed with a ball mill. Since the ball mill is sealed, the mixing ratio is not changed during grinding and dispersion, the stable grinding and mixing treatment can be performed. Among types of ball mills, a planetary ball mill is preferable because large griding power is produced to be able to perform fine grinding and reduce the grinding time. Although the conditions of the grinding and mixing when the ball mill is used are not particularly limited, for example, the grinding and mixing is performed at 400 rpm for 10 hours.

EXAMPLES

Although Examples and the like in the present invention will then be described, the present invention is not limited to Examples and the like described below.

Examples 1 to 4

In Examples 1 to 4, aluminum serving as a negative electrode active material, $CeBaF_{2.95}$ serving as a fluoride ion conductive fluoride and acetylene black serving as a conductive aid were used to produce a negative electrode material mixture composite for a fluoride ion secondary battery.

[Mixture Step]

Aluminum in the shape of nanoparticles, $Ce_{0.95}Ba_{0.05}F_{2.95}$ and the acetylene black shown in table 1 were weighed as shown in table 1. After the weighing, aluminum was put into a ball mill container made of silicon Comparative Example 1

A negative electrode material mixture for a fluoride ion secondary battery was obtained as in Examples 1 to 4 except that instead of aluminum, modified aluminum fluoride disclosed in Japanese Unexamined Patent Application, Publication No. 2018-059703 was used as the negative electrode active material.

An operation for obtaining the modified aluminum fluoride is described below. The collection rate of the negative electrode material mixture for a fluoride ion secondary battery which was obtained is shown in table 1.

[Modified Aluminum Fluoride]

Lithium (Li) metal was used, and thus aluminum fluoride ($AlF_3$) was formed into the modified aluminum fluoride.

(Weighing and Preliminary Mixing of Raw Materials)

The aluminum fluoride ($AlF_3$) and the lithium (Li) metal were weighed such that aluminum fluoride:lithium (mole rate) was 90:10 and that the total amount was 6.0 grams. A mortar and a pestle made of agate were used to perform preliminary mixing for about 1 hour, and thus the mixed powder of raw materials was obtained.

Since each of the aluminum fluoride ($AlF_3$) and the lithium (Li) metal was highly reactive with water, the weighing and the preliminary mixing of the raw materials were performed within a glove box (made by Miwa Manufacturing Co., Ltd., model DBO-1.5BNK-SQ1).

<Evaluations of Negative Electrode Material Mixture Composite for Fluoride Ion Secondary Battery>

Various types of observations and evaluations were performed on the negative electrode material mixture composites for a fluoride ion secondary battery and the negative electrode material mixtures for a fluoride ion secondary battery produced in Examples and Comparative Example.

[SEM Observation]

Figure 2:
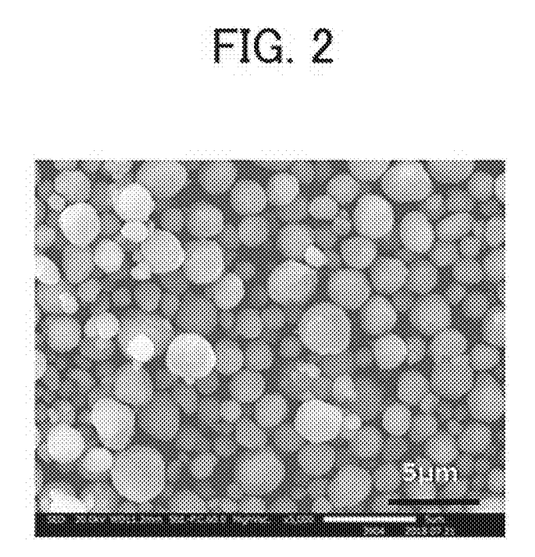
FIG. 2 is an SEM photograph of a negative electrode material mixture composite for a fluoride ion secondary battery produced in Example 1.
Figure 3:
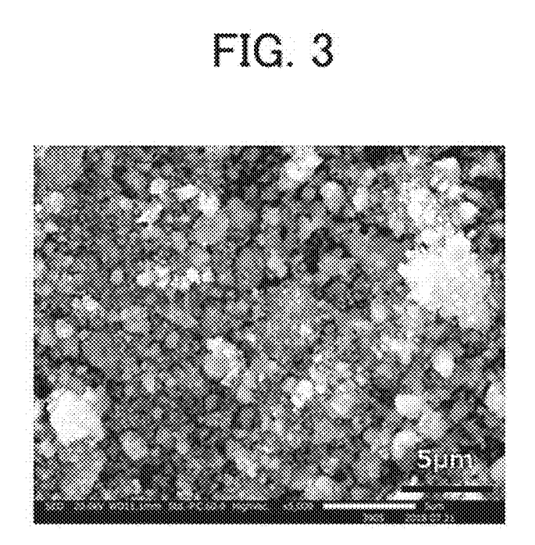
FIG. 3 is an SEM photograph of a negative electrode material mixture for a fluoride ion secondary battery produced in Comparative Example 1.

An SEM was used to obtain secondary electron images of the negative electrode material mixture composite for a fluoride ion secondary battery produced in Example 1 and the negative electrode material mixture for a fluoride ion secondary battery produced in Comparative Example 1. FIG. 1 shows an SEM photograph of the negative electrode material mixture composite for a fluoride ion secondary battery produced in Example 1, and FIG. 2 shows an SEM photograph of the negative electrode material mixture for a fluoride ion secondary battery produced in Comparative Example 1.

As shown in FIG. 1, the negative electrode material mixture composite for a fluoride ion secondary battery according to the present invention is in the shape of spherical particles. On the other hand, it is found that the negative electrode material mixture for a fluoride ion secondary battery produced in Comparative Example 1 is not granulated.

[X-Ray Diffraction Pattern]

An XRD (made by Rigaku Corporation, SmartLaB, Cu—Kα source, λ=1.5418 Å) was used to analyze the crystal structures of the negative electrode material mixture composite for a fluoride ion secondary battery produced in Example 1, aluminum (represented by nanoAl) serving as the negative electrode active material and $Ce_{0.95}Ba_{0.05}F_{2.95}$ (represented by CBF) serving as the fluoride ion conductive fluoride. An XRD chart is shown in FIG. 4.

Figure 4:
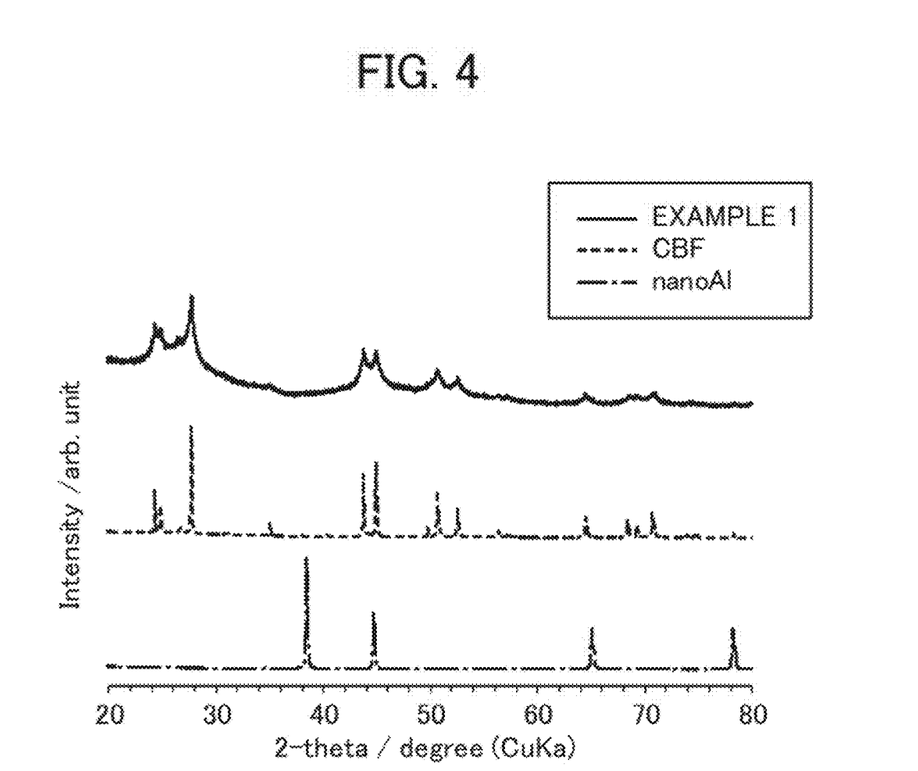
FIG. 4 is an XRD chart of various types of materials and the negative electrode material mixture composite for a fluoride ion secondary battery in Example 1.

As shown in FIG. 4, in the negative electrode material mixture composite for a fluoride ion secondary battery produced in Example 1, a single peak of aluminum (nanoAl) was not confirmed. Hence, it is found that in the negative electrode material mixture composite for a fluoride ion secondary battery produced in Example 1, aluminum is present in an alloyed state.

[STEM Observation]

Figure 5:
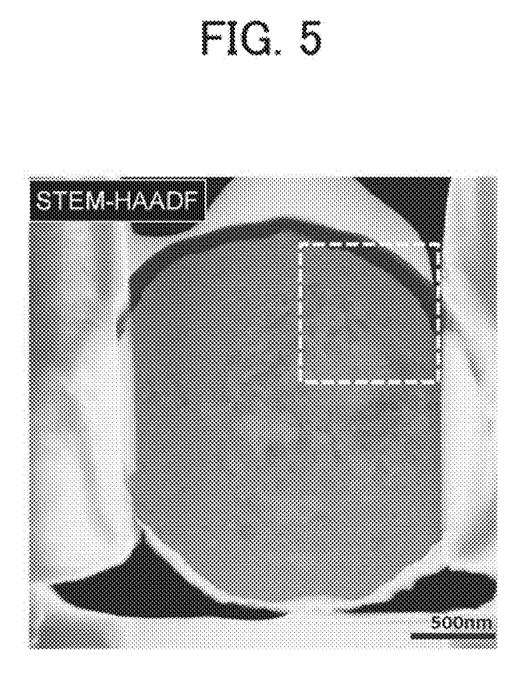
FIG. 5 is a cross-sectional STEM photograph of the negative electrode material mixture composite for a fluoride ion secondary battery in Example 1.
Figure 6A:
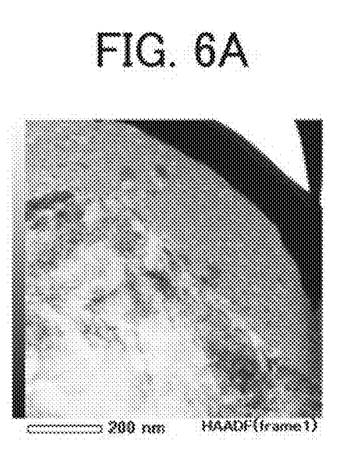
FIG. 6A is an enlarged photograph of part indicated by dashed lines in FIG. 5.

A scanning transmission electron microscope (STEM: Scanning Transmission Electron Microscopy, made by JEOL Ltd., JEM-ARM200F) was used to perform a cross-sectional observation on the negative electrode material mixture composite for a fluoride ion secondary battery produced in Example 1. FIG. 5 shows a cross-sectional STEM photograph of the negative electrode material mixture composite for a fluoride ion secondary battery produced in Example 1. FIG. 6A shows an enlarged photograph of part indicated by dashed lines in FIG. 5.

Part on the outside of a particle seen in black in FIGS. 5 and 6A is a carbon protective film for preventing damage caused by FIB treatment. Since in FIG. 6A, the center part of the particle is white and the outside thereof is black, it is found that $Ce_{0.95}Ba_{0.05}F_{2.95}$ serving as the fluoride ion conductive fluoride is mainly present in the center part, and that aluminum is mainly present in the outside.

[EDX Analysis]

Figure 6B:
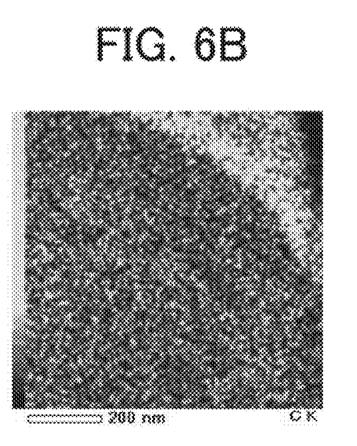
FIG. 6B is a diagram showing the distribution of a conductive aid resulting from the EDX analysis of the part indicated by the dashed lines in FIG. 5.
Figure 6C:
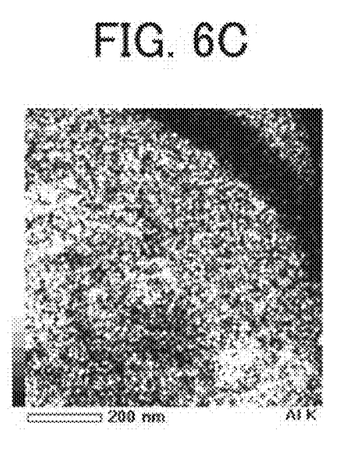
FIG. 6C is a diagram showing the distribution of aluminum resulting from the EDX analysis of the part indicated by the dashed lines in FIG. 5.
Figure 6D:
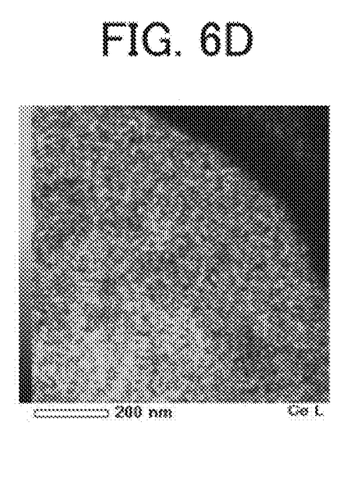
FIG. 6D is a diagram showing the distribution of a solid electrolyte resulting from the EDX analysis of the part indicated by the dashed lines in FIG. 5.

An energy dispersive X-ray spectroscope (EDX) was used to perform analysis on the part indicated by the dashed lines in FIG. 5. FIG. 6B is a diagram showing the distribution of the conductive aid resulting from the EDX analysis of the part indicated by the dashed lines in FIG. 5, FIG. 6C is a diagram showing the distribution of aluminum resulting from the EDX analysis of the part indicated by the dashed lines in FIG. 5 and FIG. 6D is a diagram showing the distribution of a solid electrolyte resulting from the EDX analysis of the part indicated by the dashed lines in FIG. 5.

It is found from FIG. 6B that the acetylene black serving as the conductive aid is evenly present within a structure, and it is estimated that the formation of an electron conduction path is satisfactory. It is found from FIGS. 6C and 6D that though part of aluminum having a length of about 100 nm is seen as a lump, aluminum and the fluoride ion conductive fluoride are evenly present within the structure so as to be in contact with each other, and it is estimated that the formation of the electron conduction path is satisfactory.

<Production of Fluoride Ion Secondary Battery>

A fluoride ion secondary battery was produced using materials below by the following method.

[Negative Electrode Material Mixture Powder]

The negative electrode material mixture composites for a fluoride ion secondary battery produced in Examples 1 to 4 or the negative electrode material mixture for a fluoride ion secondary battery produced in Comparative Example 1 was used.

[Solid Electrolyte]

$La_{0.95}Ba_{0.05}F_{2.95}$ (LBF) which was a tysonite-based solid electrolyte was used. The LBF was a known compound (see Non-Patent Documents 5 to 7), and thus the LBF was produced by a method disclosed in Non-Patent Document 5. Non-Patent Document 5: ACS Appl. Mater. Interfaces 2014, 6, 2103-2110 Non-Patent Document 6: Phys. Chem. C 2013, 117, 4943-4950 Non-Patent Document 7: J. Phys. Chem. C 2014, 118, 7117-7129

[Positive Electrode Material Mixture Powder]

63.7% by mass of lead fluoride powder (made by Kojundo Chemical Lab. Co., Ltd.), 29.6% by mass of tin fluoride (made by Kojundo Chemical Lab. Co., Ltd.) and 6.7% by mass of acetylene black (made by Denka Company Limited) were mixed with a ball mill, and were thereafter burned at 400° C. for 1 hour under an argon atmosphere to form into positive electrode material mixture powder.

[Method for Producing Fluoride Ion Secondary Battery]

Figure 7:
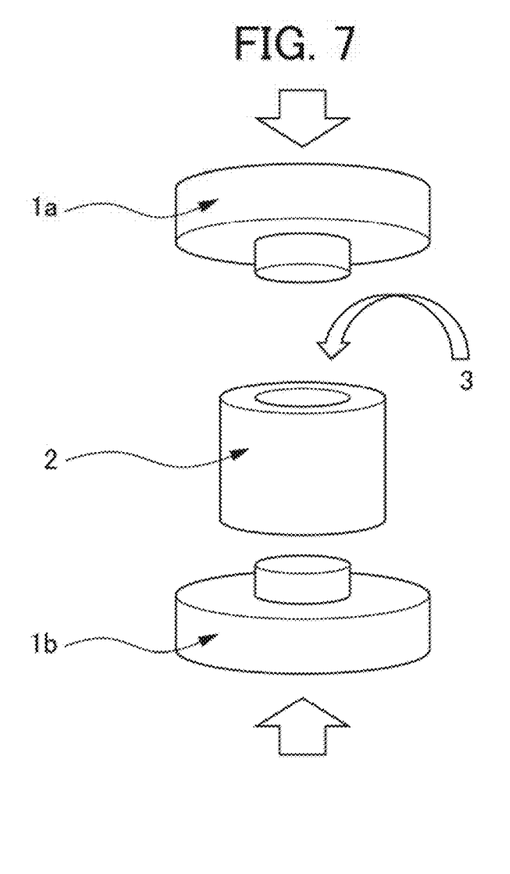
FIG. 7 is a diagram showing a method for producing fluoride ion secondary batteries in Examples and Comparative Example.

FIG. 7 shows a method for producing the fluoride ion secondary battery. As shown in FIG. 7, a tablet molder (1a and 1b) was used, battery materials 3 were sequentially put into a ceramic pipe 2 to be pressed at a pressure of 40 MPa from above and below and thus a pellet-type cell obtained by powder pressure molding was produced. As the battery materials 3, gold foil (made by the Nilaco Corporation, 99.9+%, thickness: 10 μm) serving as a negative electrode current collector, 10 mg of the negative electrode material mixture powder described above, 200 mg of the solid electrolyte, 30 mg of the positive electrode material mixture powder and lead foil (made by the Nilaco Corporation, purity: 99.99%, thickness: 200 μm) serving as a positive electrode current collector were sequentially put.

Figure 8:
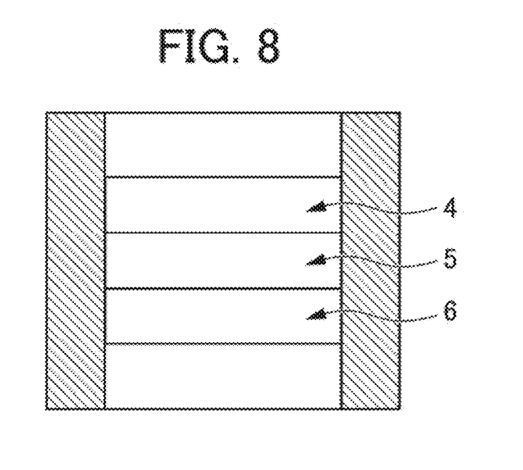
FIG. 8 is a cross-sectional view of the fluoride ion secondary batteries produced in Examples and Comparative Example.

FIG. 8 shows a cross-sectional view of the fluoride ion secondary battery which was produced. As shown in FIG. 8, in a state where the pellet-type fluoride ion secondary battery produced was sandwiched by the tablet molder, a positive electrode material mixture layer 4, a solid electrolyte layer 5 and a negative electrode material mixture layer 6 were stacked.

<Evaluations of Fluoride Ion Secondary Battery>

[Constant Current Charge/Discharge Test]

The pellet-type fluoride ion secondary battery obtained as described above was heated to 140° C. under a vacuum environment, and thus an electrochemical reaction (charge/discharge reaction) was performed. Specifically, a potentiometer galvanostat device (made by Solartron, SI1287/1255B) was used to perform a constant current charge/discharge test with a current of 0.02 mA for charge and a current of 0.01 mA for discharge at a lower limit voltage of −2.35 V and an upper limit voltage of −0.1 V. Charge/discharge curves are shown in FIGS. 9 to 12.

Figure 9:
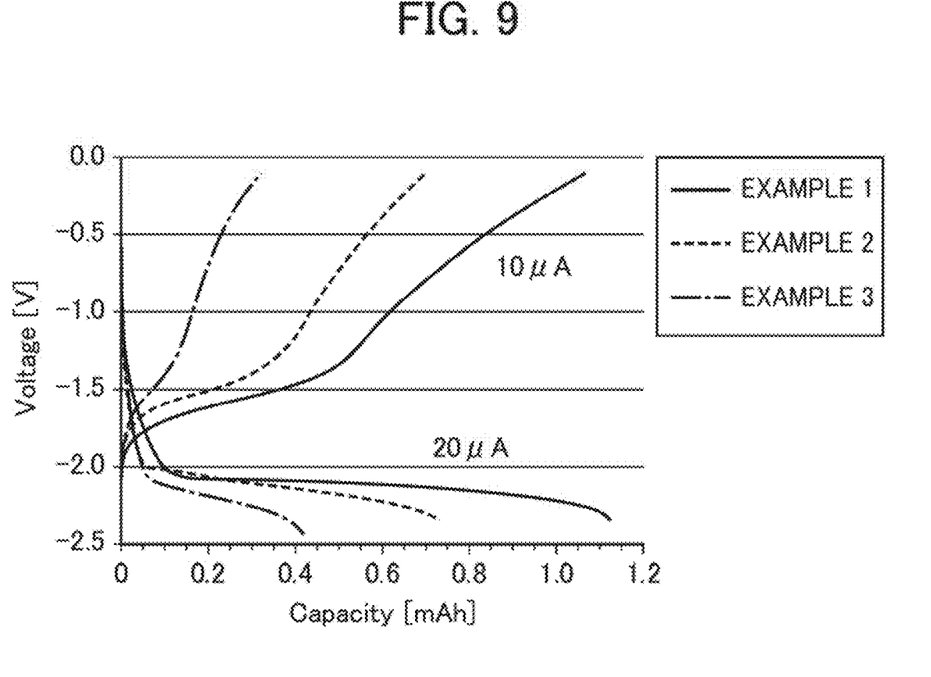
FIG. 9 is charge/discharge curves of the fluoride ion secondary batteries produced in Examples 1 to 3.

FIG. 9 is the charge/discharge curves of the fluoride ion secondary batteries in which the mixed amount of aluminum serving as the negative electrode active material was changed and which were produced in Examples 1 to 3. It is found from FIG. 9 that in the negative electrode material mixture composite for a fluoride ion secondary battery according to the present invention, as the concentration of the negative electrode active material is lowered, the capacity of the fluoride ion secondary battery obtained is increased. It is considered that this is because the supply of fluoride ions to the negative electrode active material is rate-determining.

Figure 10:
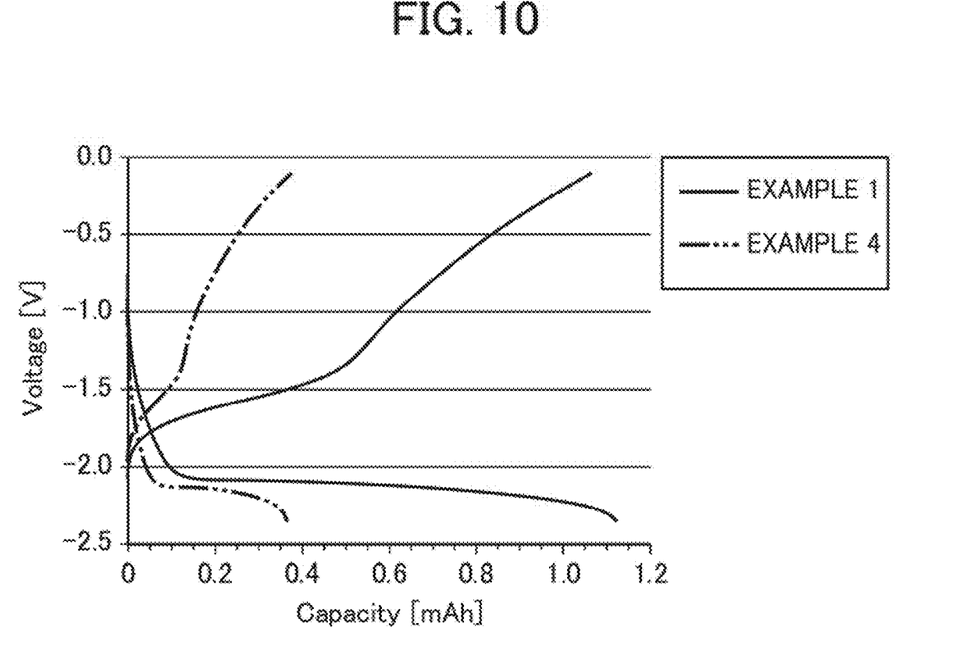
FIG. 10 is charge/discharge curves of the fluoride ion secondary batteries produced in Examples 1 and 4.

FIG. 10 is the charge/discharge curves of the fluoride ion secondary batteries in which the average particle diameter of aluminum serving as the negative electrode active material was changed and which were produced in Examples 1 and 4. It is found from FIG. 10 that in the negative electrode material mixture composite for a fluoride ion secondary battery according to the present invention, as the average particle diameter of the negative electrode active material is decreased, the capacity of the fluoride ion secondary battery obtained is increased. It is considered that this is because the proceeding of fluoride ions within the negative electrode active material is rate-determining for charge/discharge reactions (defluorination/refluorination reactions).

Figure 11:
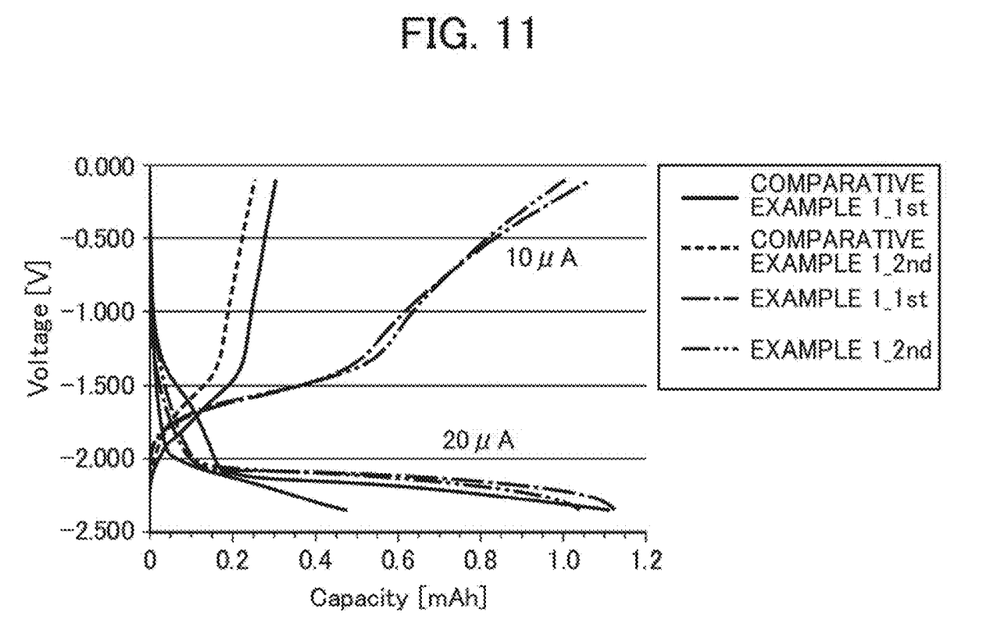
FIG. 11 is charge/discharge curves of the fluoride ion secondary batteries produced in Example 1 and Comparative Example 1.

FIG. 11 is the charge/discharge curves, in the first cycle and the second cycle, of the fluoride ion secondary batteries produced in Example 1 and Comparative Example 1. It is found from FIG. 11 that the fluoride ion secondary battery using the negative electrode material mixture composite for a fluoride ion secondary battery according to the present invention is improved in the reversibility of the electrochemical reaction.

Figure 12:
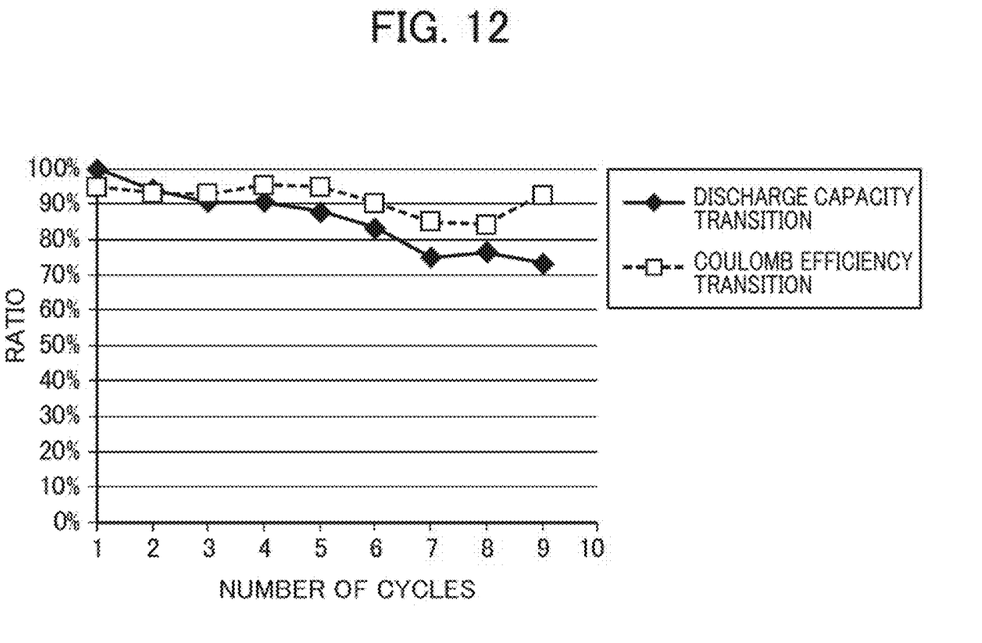
FIG. 12 is a graph showing the transition of the capacity of the fluoride ion secondary battery produced in Example 1.

FIG. 12 is a graph showing the transition of the capacity of the fluoride ion secondary battery produced in Example 1 when the charge and discharge was repeated nine times. In the vertical axis of FIG. 12, a ratio in discharge capacity transition is a ratio of a discharge capacity in each cycle to a discharge capacity in the first cycle. In the vertical axis of FIG. 12, a ratio in coulomb efficiency transition is a ratio of a discharge capacity to a discharge capacity in each cycle. It is found from FIG. 12 that the fluoride ion secondary battery using the negative electrode material mixture composite for a fluoride ion secondary battery according to the present invention shows high coulomb efficiency in the second and subsequent cycles.

EXPLANATION OF REFERENCE NUMERALS

1*a*, 1*b*: tablet molder
2: ceramic pipe
3: battery material
4: positive electrode material mixture layer
5: solid electrolyte layer
6: negative electrode material mixture layer

The invention claimed is:

1. A method for manufacturing a negative electrode material mixture composite for a fluoride ion secondary battery, the method comprising:
 a mixing step of mixing a negative electrode active material, a fluoride ion conductive fluoride and carbon black to obtain a negative electrode material mixture; and
 a composite particle formation step of subjecting the negative electrode material mixture to grinding and mixing treatment to complex the negative electrode active material, the fluoride ion conductive fluoride and the carbon black so as to obtain composite particles,
 wherein the negative electrode active material is aluminum.

2. The method for manufacturing a negative electrode material mixture composite for a fluoride ion secondary battery according to claim 1, wherein the aluminum is in the form of particles with an average particle diameter of 10 nm to 200 nm.

3. The method for manufacturing a negative electrode material mixture composite for a fluoride ion secondary battery according to claim 1, wherein the grinding and mixing treatment is dry grinding.

4. The method for manufacturing a negative electrode material mixture composite for a fluoride ion secondary battery according to claim 1, wherein the grinding and mixing treatment is performed with a ball mill.

* * * * *